2,891,954

PROCESS FOR PREPARING N-ALLYL-NORMORPHINE

John Weijlard, Maplewood, N.J., assignor to Merck & Co., Inc., Rahway, N.J., a corporation of New Jersey No Drawing. Application July 30, 1953
Serial No. 371,399

12 Claims. (Cl. 260—285)

This invention is concerned generally with the production of N-allylnormorphine. More particularly, it relates to a novel and improved process for preparing N-allylnormorphine by the reaction of normorphine with allyl halides, whereby said N-allylnormorphine is obtained in yields approaching those theoretically obtainable. N-allylnormorphine is disclosed and claimed in my U.S. Patent No. 2,364,833, issued on December 12, 1944. N-allylnormorphine has been found to prevent or to abolish the action of morphine when utilized in conjunction with that drug.

This application is a continuation-in-part of my copending application Serial No. 262,346, filed December 18, 1951, now abandoned.

Heretofore N-allylnormorphine has been prepared by reacting together, in an organic solvent, two molecular equivalents of normorphine with 1 molecular equivalent of an allyl halide. This process has the disadvantage of requiring the use of a sealed reaction vessel. Moreover, in this prior art procedure it was found essential that two molecular equivalents of normorphine be utilized for each mole of the allyl halide in order to obtain appreciable yields of the desired N-allylnormorphine. The recovery of N-allylnormorphine from the reaction mixture obtained in accordance with this prior procedure was thus complicated by the necessity of separating the desired N-allylnormorphine from the normorphine hydrobromide by-product which was present in said reaction mixture in an amount approximately equal to that of the N-allylnormorphine. The overall yields of N-allylnormorphine obtained employing this prior method were therefore generally very low, within the range of 20–25% of theory.

I have now discovered that extremely high yields of N-allylnormorphine, approaching those theoretically obtainable, and consistently over 85% of theory, may be obtained by a novel and improved procedure wherein the normorphine and allylhalide reactants are reacted together in equimolecular portions, instead of utilizing the 100% molecular excess of normorphine reactant heretofore considered essential in this reaction. In this improved procedure, the equimolecular equivalents of normorphine and allyl halide such as allyl chloride, allyl bromide, and the like, are dissolved in a substantially anhydrous organic solvent nad the solution is heated in contact with an acid-binding agent. I ordinarily utilize, as the acid-binding agent, an alkali metal bicarbonate such as sodium bicarbonate and potassium bicarbonate, an alkali metal carbonate such as sodium carbonate, lithium carbonate and potassium carbonate, an alkaline earth metal carbonate such as barium carbonate, calcium, carbonate and strontium carbonate, and the like, in conjunction with an organic solvent comprising a lower alkanol, such as ethanol, methanol, isopropanol, butanol, amyl alcohol, and the like.

In carrying out the reaction, the alcohol solution containing equimolecular equivalents of normorphine and allyl halide, preferably allyl bromide, is agitated and heated under reflux in contact with a molecular excess of the acid-binding agent for a period of several hours. I ordinarily utilize about one and one-half molar equivalents of said acid-binding agent, preferably an alkali metal bicarbonate such as sodium bicarbonate, in conjunction with a lower alkanol solution containing one equivalent each of normorphine and an allyl halide, preferably allyl bromide, under which conditions the reaction is substantially complete after a heating period of five to six hours, and the N-allylnormorphine is produced in a yield of about 85% of theory. The N-allylnormorphine thus formed is conveniently recovered from the reaction mixture by evaporating the organic solvent, preferably under reduced pressure, and extracting the residual material with a hot chlorinated hydrocarbon solvent, such as chloroform. The resulting solution, which can be purified if desired by treatment with activated charcoal, is then evaporated to give crude N-allylnormorphine. This product can be partially purified by trituration with an anhydrous dialkyl ether, and can be further purified by recrystallization from an alcoholic solvent such as methanol.

The following examples illustrate methods of carrying out the present invention, but it is to be understood that these examples are given for purposes of illustration and not of limitation.

*Example 1*

One hundred and twenty grams of anhydrous, analytically pure normorphine (0.44 mole) were suspended in 1500 cc. of absolute alcohol, and to this suspension was added 53.5 g. of allyl bromide (0.44 mole) followed by 53.5 g. of sodium bicarbonate (0.63 mole). The resulting mixture was stirred and heated under reflux for a period of about five and one-half hours. The hot reaction solution was evaporated to dryness in vacuo, and the residual material was triturated with 1200 cc. of hot chloroform. Approximately 10 g. of activated charcoal (Darco) was added to the hot chloroform solution, the resulting mixture was stirred, and the resulting charcoal slurry was filtered hot through a layer of diatomaceous silica (Supercel). The insoluble material (Supercel, Darco and salts) was washed with four 75 cc.-portions of boiling chloroform. The clear chloroform solution and washings were combined, and the resulting solution was evaporated to dryness in vacuo. The residual material was triturated with 450 cc. of anhydrous diethyl ether until completely crystalline. The crystalline slurry was cooled to 2° C., and maintained at this temperature for a period of about 15 hours. The ethereal slurry was then filtered, the crystalline product was washed with three 50 cc.-portions of cold diethyl ether (temperature about 0° C.), and the washed product was air-dried to give 117 g. of crude N-allylnormorphine; M.P. 198–201° C.; mixed M.P. with an authentic sample of N-allylnormorphine showed no depression; yield 85.3% of theory.

The crude material obtained as described hereinabove was purified as follows: 117 g. of said crude N-allylnormorphine (M.P. 198–201° C.) were dissolved in 1000 cc. of hot methanol, 5 cc. of activated charcoal (Darco) was added to the methanolic solution, and the resulting mixture was stirred, filtered hot and the charcoal filter cake was washed with 170 cc. of hot methanol. The filtered methanol solution and washings were combined and evaporated in vacuo to a volume of 390 to 400 cc. The resulting methanol solution was cooled to approximately 2° C., and allowed to stand at this temperature for a period of about 15 hours. The crystalline material which separated was recovered by filtration, washed with three 35 cc.-portions of ice-cold methanol, and dried in vacuo over sulfuric acid to constant weight to give 97.7 g. of substantially pure N-allylnormorphine; M.P. 205–207° C.; recovery yield approximately 83.5% of theory. An additional 8.3 g. of product was recovered from the mother liquors to give a total yield of 106 g. of N-allylnormorphine; recovery yield approximately 90.6% of theory.

*Example 2*

Six grams of normorphine (0.022 mole), 2.7 g. of allyl bromide (0.022 mole), 75 cc. of anhydrous ethanol, and 3.15 g. of potassium bicarbonate (0.0315 mole) were mixed, and the mixture was heated under reflux with stirring for a period of about five and one-half hours. The reaction mixture was evaporated to dryness in vacuo, the residual material was extracted with 60 cc. of boiling chloroform, 0.5 g. of activated charcoal was added, and the resulting mixture was filtered through a layer of diatomaceous silica. The filter cake was washed with four 10 cc.-portions of boiling chloroform, and the chloroform filtrate and washings were combined and evaporated to dryness in vacuo. The residual material was triturated with 25 cc. of anhydrous ether until crystalline, the ethereal mixture was cooled, maintained at a temperature of 3° C. overnight, filtered, and the crystalline mixture was washed with three 10 cc.-portions of ice-cold ether. The resulting crystalline product was dried to give five grams of N-allylnormorphine; yield approximately 73% of theory.

*Example 3*

Six grams of normorphine, 2.7 g. of allyl bromide, 2.65 g. of sodium bicarbonate, and 75 cc. of methanol were mixed together, and the resulting mixture was heated under reflux with stirring for a period of above five and one-half hours. The reaction mixture was evaporated to dryness in vacuo, the residual material was extracted with 60 cc. of boiling chloroform, 0.5 g. of activated charcoal was added, and the resulting mixture was filtered through a layer of diatomaceous silica. The filter cake was washed with four 10 cc.-portions of boiling chloroform, and the chloroform filtrate and washings were combined and evaporated to dryness in vacuo. The residual material was triturated with 25 cc. of anhydrous ether until crystalline, the ethereal mixture was cooled, maintained at a temperature of 3° C. overnight, filtered, and the crystalline mixture was washed with three 10 cc.-portions of ice-cold ether. The resulting crystalline product was dried to give 6.0 g. of N-allylnormorphine; yield approximately 87% of theory.

*Example 4*

Six grams of normorphine, 2.7 g. of allyl bromide, 1.27 g. of sodium carbonate and 75 cc. of isopropanol were mixed together, and the resulting mixture was heated under reflux with stirring for a period of about three hours; an additional 1.27 g. of sodium carbonate was then added and the mixture was heated under reflux with stirring for an additional four-hour period. The reaction mixture was evaporated to dryness in vacuo, the residual material was extracted with 60 cc. of boiling chloroform, 0.5 g. of activated charcoal was added, and the resulting mixture was filtered through a layer of diatomaceous silica. The filter cake was washed with four 10 cc.-portions of boiling chloroform, and the chloroform filtrate and washings were combined and evaporated to dryness in vacuo. The residual material was triturated with 25 cc. of anhydrous ether until crystalline, the ethereal mixture was cooled, maintained at a temperature of 3° C. overnight, filtered, and the crystalline mixture was washed with three 10 cc.-portions of ice-cold ether. The resulting crystalline product was dried to give 4.8 g. of N-allylnormorphine; yield approximately 70% of theory.

*Example 5*

Six grams of normorphine, 2.7 g. of allyl bromide, 1.2 g. of calcium carbonate and 75 cc. of anhydrous ethanol were mixed together, and the mixture was heated under reflux with stirring for a period of about five and one-half hours. The reaction mixture was evaporated to dryness in vacuo, the residual material was extracted with 60 cc. of boiling chloroform, 0.5 g. of activated charcoal was added, and the resulting mixture was filtered through a layer of diatomaceous silica. The filter cake was washed with four 10-cc.-portions of boiling chloroform, and the chloroform filtrate and washings were combined and evaporated to dryness in vacuo. The residual material was triturated with 25 cc. of anhydrous ether until crystalline, the ethereal mixture was cooled, maintained at a temperature of 3° C. overnight, filtered, and the crystalline mixture was washed with three 10 cc.-portions of ice-cold ether. The resulting crystalline product was dried to give 0.65 g. of N-allylnormorphine; yield approximately 10% of theory.

Various changes and modifications may be made in carrying out the present invention without departing from the spirit and scope thereof. Insofar as these changes and modifications are within the purview of the annexed claims, they are to be considered as part of my invention.

I claim:

1. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising a lower alkanol in the presence of a molecular excess of an acid-binding agent selected from the group which consists of alkali metal bicarbonates, alkali metal carbonates and alkaline earth metal carbonates, thereby producing said N-allylnormorphine.

2. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising a lower alkanol in the presence of a molecular excess of an alkali metal bicarbonate, thereby producing said N-allylnormorphine.

3. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising a lower alkanol in the presence of a molecular excess of an alkali metal carbonate, thereby producing said N-allylnormorphine.

4. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising a lower alkanol in the presence of a molecular excess of sodium bicarbonate, thereby producing said N-allylnormorphine.

5. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising a lower alkanol in the presence of a molecular excess of an alkaline earth metal carbonate, thereby producing said N-allylnormorphine.

6. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising substantially anhydrous methanol in the presence of a molecular excess of sodium bicarbonate, thereby producing said N-allylnormorphine.

7. In the process of preparing N-allylnormorphine by the reaction between normorphine and an allyl halide, the improvement which comprises bringing together equal molar equivalents of normorphine and an allyl halide selected from the group which consists of allyl chloride, allyl bromide and allyl iodide in a solvent comprising substantially anhydrous ethanol in the presence of a molecular excess of sodium bicarbonate, thereby producing said N-allylnormorphine in a yield of approximately 85% of that theoretically obtainable.

8. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising substantially anhydrous ethanol in the presence of a molecular excess of potassium bicarbonate, thereby producing said N-allylnormorphine.

9. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising substantially anhydrous ethanol in the presence of a molecular excess of calcium carbonate, thereby producing said N-allylnormorphine.

10. In the process of preparing N-allylnormorphine by the reaction between normorphine and an allyl halide, the improvement which comprises bringing together approximately equimolecular equivalents of normorphine and an allyl halide selected from the group which consists of allyl chloride, allyl bromide and allyl iodide in a solvent comprising isopropanol in the presence of a molecular excess of sodium carbonate, thereby producing said N-allylnormorphine.

11. In the process of preparing N-allylnormorphine by the reaction between normorphine and allyl bromide, the improvement which comprises bringing together approximately equimolecular equivalents of normorphine and allyl bromide in absolute ethanol in contact with a molecular excess of sodium bicarbonate, thereby producing said N-allylnormorphine in a yield of over 85% of that theoretically obtainable.

12. The process which comprises agitating and heating under reflux a solution containing substantially equimolecular equivalents of normorphine and allyl bromide in absolute ethanol having suspended therein approximately one and one-half molar equivalents of sodium bicarbonate, continuing said agitation and heating under reflux for a period of about 5 to 6 hours, thereby producing N-allylnormorphine in a yield of approximately 90% of theory.

References Cited in the file of this patent

UNITED STATES PATENTS

| | | |
|---|---|---|
| 2,364,833 | Weijlard | Dec. 12, 1944 |
| 2,611,768 | Butler et al. | Sept. 23, 1952 |
| 2,625,566 | Heinzelmann | Jan. 13, 1953 |